US012371064B2

(12) United States Patent
Godsey et al.

(10) Patent No.: US 12,371,064 B2
(45) Date of Patent: Jul. 29, 2025

(54) SIMULTANEOUS LOCALIZATION AND MAPPING AND NEURAL NETWORK SYSTEM

(71) Applicant: BDCM A2 LLC, Dover, DE (US)

(72) Inventors: Sandra Lynn Godsey, Carlsbad, CA (US); Matthew Paul Harrison, Palo Alto, CA (US)

(73) Assignee: BDCM A2 LLC, Dover, DE (US)

( * ) Notice: Subject to any disclaimer, the term of this patent is extended or adjusted under 35 U.S.C. 154(b) by 0 days.

(21) Appl. No.: 16/813,640

(22) Filed: Mar. 9, 2020

(65) Prior Publication Data

US 2020/0283026 A1    Sep. 10, 2020

Related U.S. Application Data

(60) Provisional application No. 62/815,317, filed on Mar. 7, 2019.

(51) Int. Cl.
*B60W 60/00*     (2020.01)
*G05D 1/00*      (2024.01)
*G06N 3/08*      (2023.01)

(52) U.S. Cl.
CPC .... *B60W 60/0027* (2020.02); *B60W 60/0011* (2020.02); *G05D 1/0094* (2013.01); *G06N 3/08* (2013.01)

(58) Field of Classification Search
CPC .......... B60W 60/0011; B60W 60/0027; G05D 1/0094; G05D 1/0257; G05D 1/0274; G05D 1/0088; G06N 3/08; G06N 3/045; G01S 2013/93271; G01S 7/417; G01S 13/931; G01S 13/865; G01S 13/867
See application file for complete search history.

(56) References Cited

U.S. PATENT DOCUMENTS

| | | | |
|---|---|---|---|
| 10,706,284 B2* | 7/2020 | Eaton | G06K 9/00718 |
| 11,042,157 B2* | 6/2021 | Choe | G06T 7/50 |
| 2016/0109243 A1* | 4/2016 | Tseng | G01C 21/26 701/408 |
| 2017/0316333 A1* | 11/2017 | Levinson | G05D 1/0088 |
| 2017/0329332 A1* | 11/2017 | Pilarski | B60W 30/095 |
| 2018/0005053 A1* | 1/2018 | Browning | G06K 9/00798 |
| 2019/0176841 A1* | 6/2019 | Englard | B60W 30/18163 |
| 2019/0217793 A1* | 7/2019 | Van Hoecke | B60W 30/143 |
| 2019/0258251 A1* | 8/2019 | Ditty | G06K 9/00805 |

OTHER PUBLICATIONS

NTT DOCOMO, "Initial Views on Connectivity Design Framework for Automotive Applications," IWPC Workshop on Connected Cars, V2X and Autonomous Vehicles Duseeldorf, Germany, pp. 1-16, Apr. 2017.

* cited by examiner

*Primary Examiner* — Hitesh Patel
*Assistant Examiner* — Wenyuan Yang
(74) *Attorney, Agent, or Firm* — Dinsmore & Shohl LLP

(57) ABSTRACT

A perception engine incorporating place information for a vehicular sensor. The system uses place information to trigger responses in a perception engine. In some examples the system implements a mirroring process in response to other vehicle actions.

12 Claims, 11 Drawing Sheets

SIMULTANEOUS LOCALIZATION AND MAPPING AND NEURAL NETWORK SYSTEM

CLAIM OF PRIORITY

This application claims priority from U.S. Provisional Application No. 62/815,317, titled "SIMULTANEOUS LOCALIZATION AND MAPPING AND NEURAL NETWORK SYSTEM," filed on Mar. 7, 2019, and incorporated herein by reference in its entirety.

FIELD OF THE INVENTION

The present application for patent relates to object detection and pattern recognition in a radar system, such as for autonomous vehicles.

BACKGROUND

It is evident that while human drivers are able to detect objects, conditions, and environments naturally, computers have difficulty with some of the most rudimentary tasks. Recently, Artificial Intelligence (AI) is an active development area for object detection and perception in many applications, including automotive applications where more and more functionality is automated. Vehicles incorporate a variety of sensors to imitate and replace human drivers. Sensor behavior is often basic and machine-like; good at detecting various parameters in the vicinity of a sensor, but less able to correlate that data to a sense of place or to sufficiently understand environmental conditions so as to replace a human driver.

BRIEF DESCRIPTION OF THE DRAWINGS

The present application may be more fully appreciated in connection with the following detailed description taken in conjunction with the accompanying drawings, which are not drawn to scale, in which like reference characters refer to like parts throughout, and in which.

DETAILED DESCRIPTION

The present technologies provide methods and apparatuses to enable reliable, accurate perception in an environment by incorporating place information in addition to sensor signals. The sensor fusion processing develops place cell corresponding to a place field based on historical activity. In the human brain, a place cell is a neuron that triggers when the person enters a place in their environment. The place cell acts to identify the location of the place with place information, wherein the location is referred to as a place field. The human is then able to recall the place field from the triggered place cell. In a computational application, a place cell may be software, an algorithm, network, or structure; the place cell reacts to a combination of sensor signals to identify a place field or specific location or area. The place field may correspond to a location or a type of location, such as an inner-city intersection. The place cell may be part of the sensor fusion, implemented in software, algorithm or structure, able to use the sensor inputs to recognize place field.

The place information may be stored by type in memory and accessed by the perception engine or may be requested from a local source, such as a module in a smart city, and received in a usable form. The place information may be used to adjust the scan parameters, such as to initiate a finer scan of the local environment, a long-range scan, and so forth. The place information has a variety of parameters that may change in a given situation. The place may correspond to a type of environment, such as a long windy road or a busy city block. Each type will be dependent on other factors. In one example, at times when an inner-city block is congested, instructions to the perception engine may act to heighten identification of pedestrians. In some embodiments, the vehicle mirrors the behavior of other vehicles to determine a best action.

In these and other embodiments, sense of place is comprehended by the vehicle through this information either received or deduced. Similar to a cultural sense of place which provides an identity to people living there and visitors, these features provide a vehicular sense of place giving the roads and byways an identity understood by the vehicle.

Figure 1:
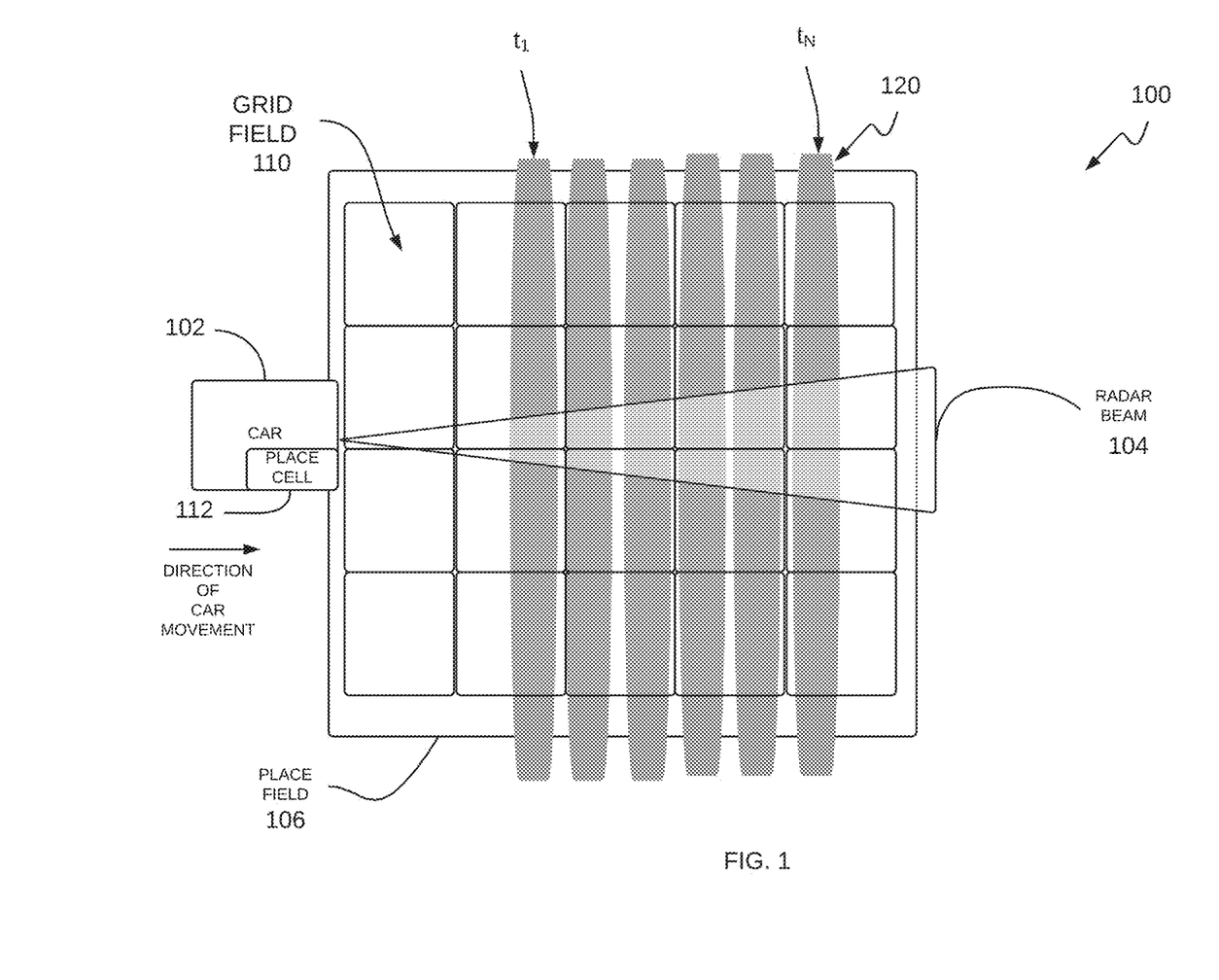
FIG. 1 illustrates an example of a vehicle in an environment having a sensor that incorporates place and grid features.

FIG. 1 illustrates an environment 100 where a vehicle 102 is moving in an immediate area or place field 106. For evaluation and perception within the place field 106, a grid is overlaid on place field 106, having multiple grid fields 110. In this embodiment, the grid fields 110 are the same size and shape; alternate embodiments may incorporate a variety of shapes and sizes. For example, the grid fields 110 closer to the vehicle of interest may be smaller and increase in size and/or change shape with distance from the vehicle. The vehicle 102 transmits a radar beam 104 that covers a portion of the place field 106 at a given time. The radar beam 104 may scan the area moving across a portion of the place field or the entire place field. At each time, the place field 106 changes and moves similar to a window over a larger environmental area. Slices 120 of the place field 106 correspond to different times corresponding to the movement of the vehicle 102. The vehicle 102 has a place cell 112 that is a perception engine. The grid fields 110 each have associated characteristics that may provide information to the perception engine of the place cell 112. The place cell 112 receives information from a radar module (not shown) in the vehicle 102 and may receive other sensor information, such as camera or lidar, and uses this information to identify place fields known to the place cell 112. The place cell 112 also learns as it obtains new and/or repeating information as the vehicle 102 travels, similar to the place cells in a human brain. This may be useful, as most drivers have repeated routes and travel to a limited number of locations on a regular basis, such as work, school, grocery store, and so forth.

Figure 2:
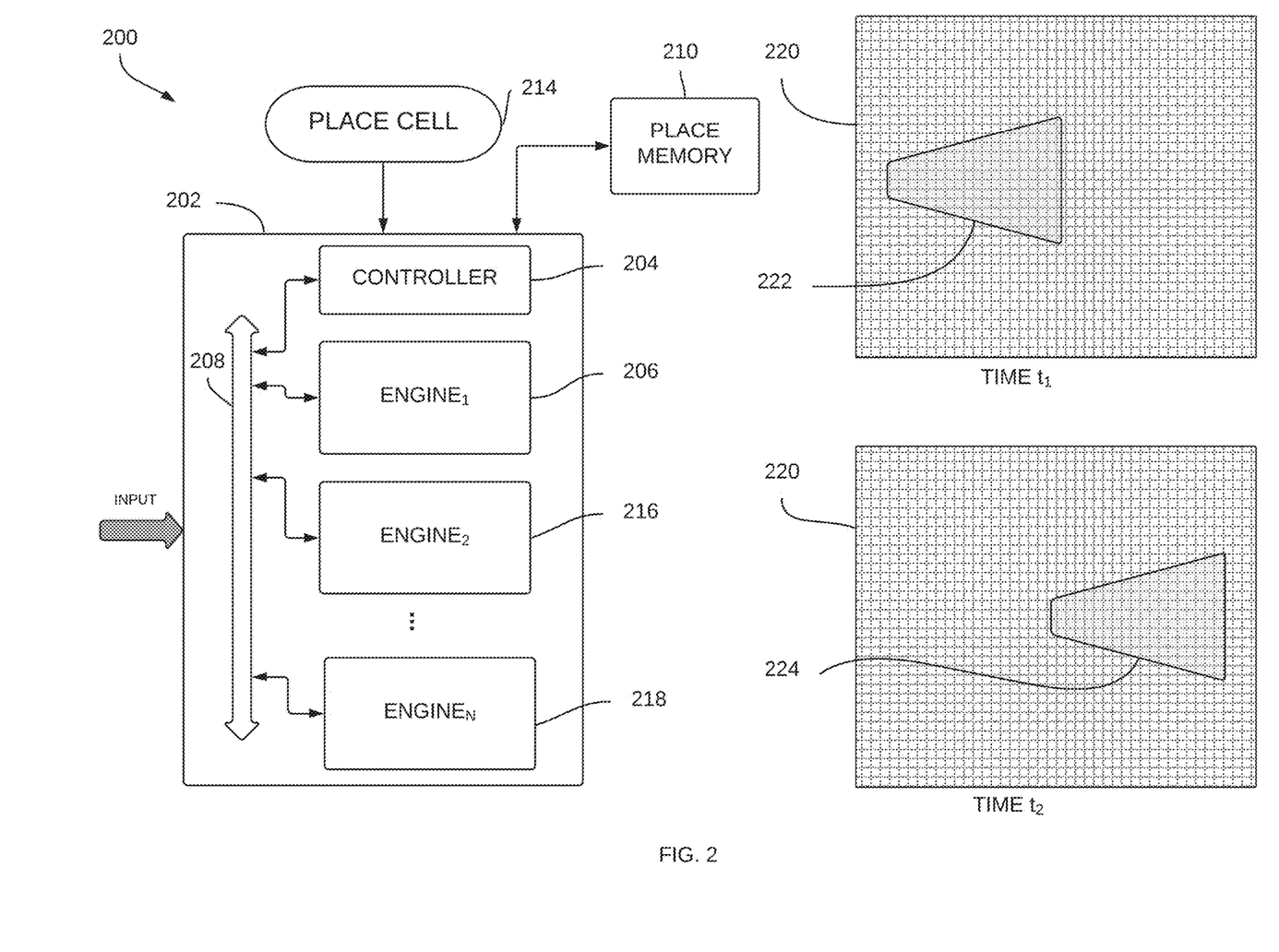
FIG. 2 illustrates an example of a perception engine incorporating place information.

FIG. 2 illustrates an example of a perception engine 200 incorporating place information into the evaluation and perception processes. The perception engine 200 may be an artificial intelligent engine, such as a neural network (NN), convolutional NN, machine learning device and so forth. In some examples, the perception engine 200 may include multiple engines, where each engine corresponds to a different place. A place cell module 214 identifies a place, or type of place, to the perception engine 202 and the controller 204 determines the specific engine to operate. For example, a first perception engine 206 corresponds to a first place and the perception process is done according to the first place. In this way, the perception engine 200 can separate processing of a congested inner-city situation from a country road and overlay time of day and other information to enhance perception. The place information is stored in place memory 210. The perception engine 200 may apply weights, thresholds, or other parameters for processing sensor information as input received from sensors, such as radar data. For a place field 220, a vehicle in a first place 222 at time $t_1$ will use a first perception engine 206 and the vehicle moves to a second place 224 at time t2 and will use a second perception engine 216. There may be any number of perception engines, each having associated with a location or type of location. The different perception engines 206, 216, . . . 218 may be achieved by changing weights or parameters of a single perception engine or may be unique perception engines, wherein each perception engine is trained on a specific location. In this way, the place cell 214 identifies location of the vehicle at a specific location, place field 222 or place field 224 within place field 220.

Figure 3:
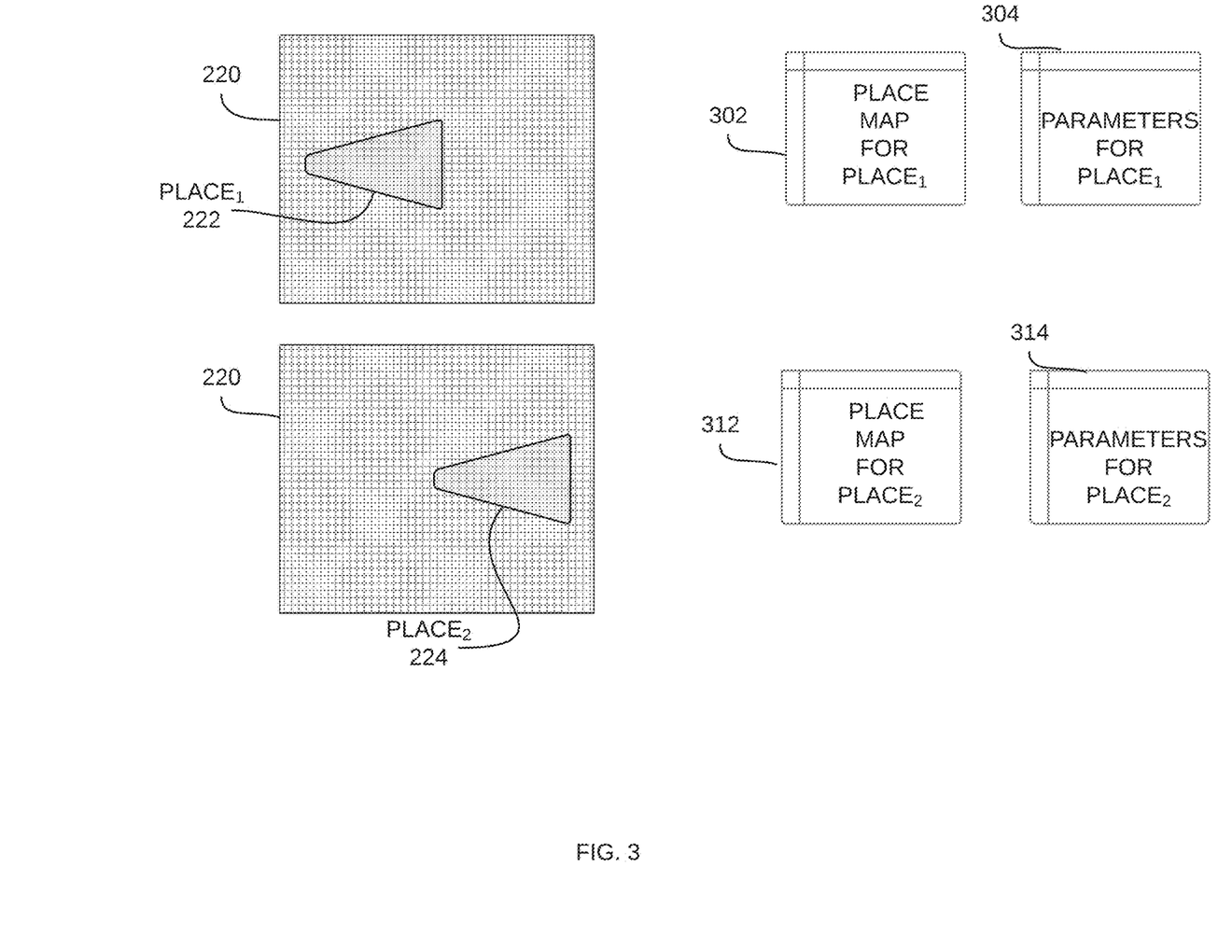
FIG. 3 illustrates examples of place maps and parameters for a vehicle moving through an environment.

FIG. 3 illustrates the place maps and parameters corresponding to each place field 222, 224 of FIG. 2. As the vehicle moves it experiences a continuously changing environment, wherein each place field has a set of characteristics and features. The information from each place field is then used to generate or locate, such as from stored memory, a place map and parameters for the place. In this situation, a first place 222 has corresponding map 302 and set of parameters 304. A second place 224 has a corresponding map 312 and set of parameters 314. The perception engines apply these parameters, maps, and other information to assist in forming a view and understanding the path of the vehicle and environment within which it operates. The place maps and parameters are analog to the sensory inputs and triggers that the human brain uses to identify a location. These combine geographical information with environmental information. This may include traffic information at a given time of day, temperature, weather, and other things that assist in the perception or recognition process.

Figure 4:
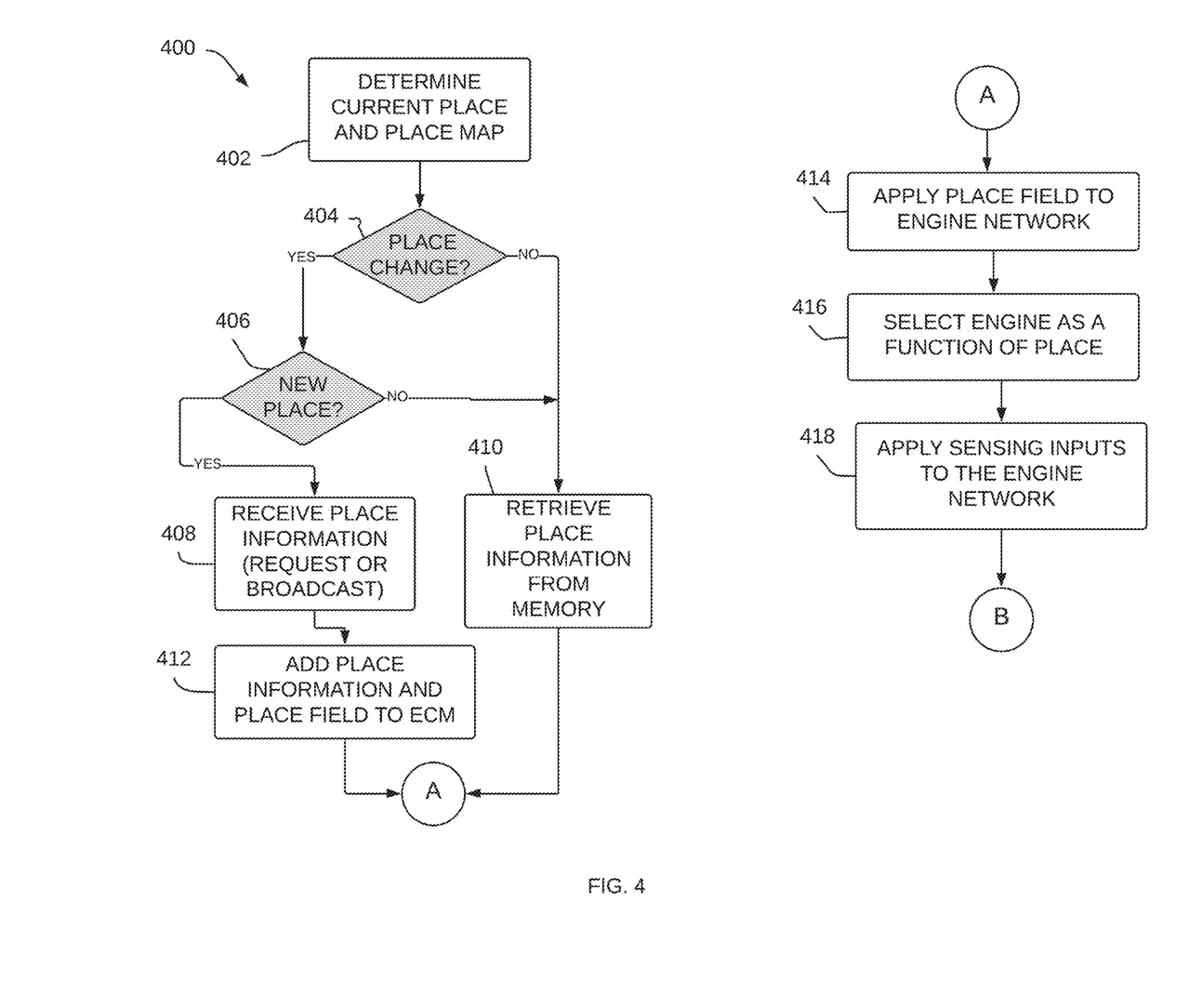
FIGS. 4-5 illustrate example process flows for a perception engine incorporating place information.

FIG. 4 illustrates a process 400 for applying place information to the perception engine operation. The process 400 determines a current place of the vehicle and vehicle sensor, 402. If there is a place change, 404, the process determines if this is a new place, 406, which is a place encountered less than a threshold number of times, such as the first time. For a new place, the perception engine receives or requests place information. This may be information that is broadcast in the environment or may involve a communication to a central information provider, 408. The place information is provided to and stored in memory, 412, so as to expand the knowledge base of place information. Returning to step 404, if there is no place change or if the place change is to a known location, the processing retrieves the place information from memory, 410. The process then applies place field information to the perception engine network, 414, to select an engine as a function of place information, 416. At this point, the perception engine network is ready for operation, 418.

Figure 5:
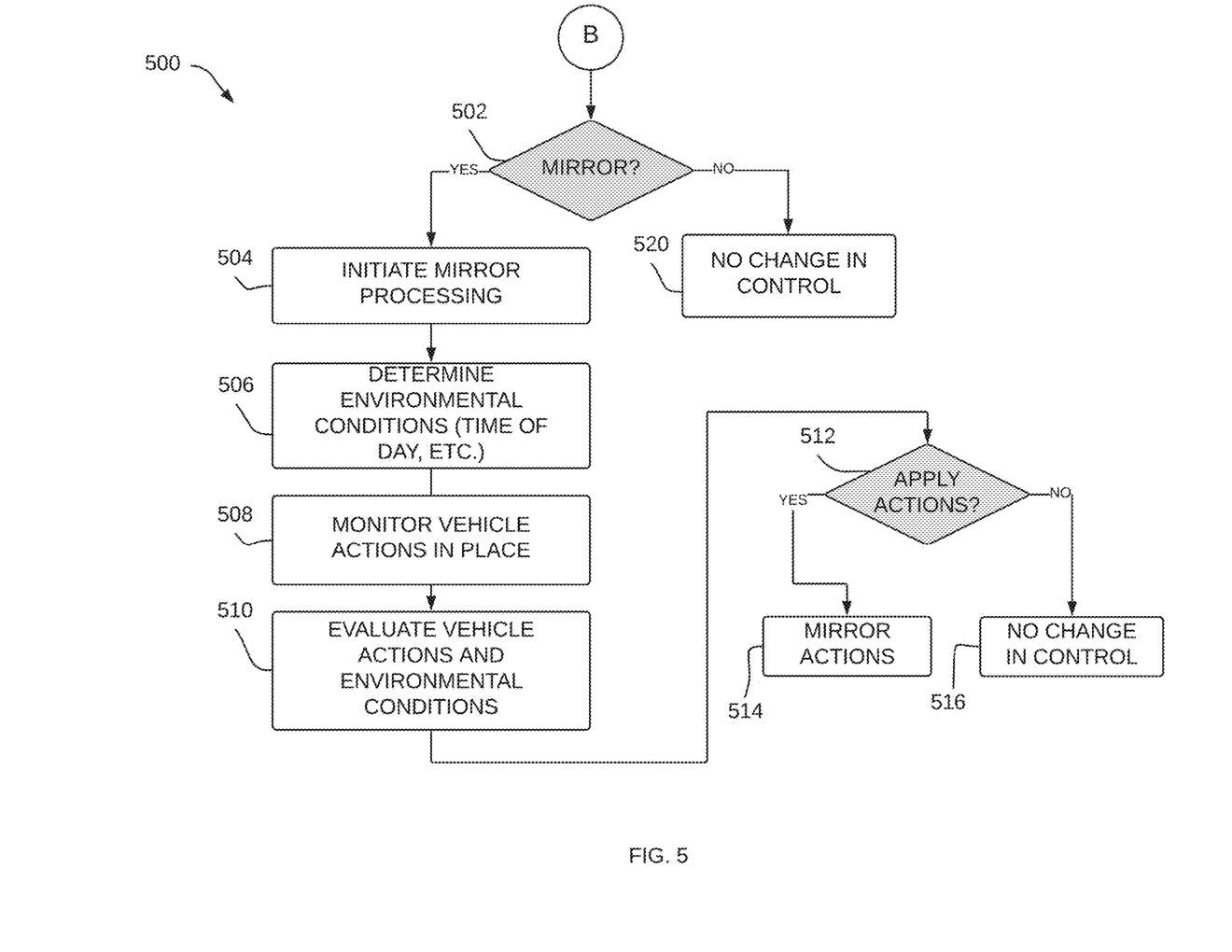

The information describing a place includes information from a variety of sources, such as GPS, memory, external broadcast of information, other sensors in the vehicle, and so forth. In addition, the time of day, weather and so forth are used by the perception engine and the responsive actions to be taken. One source of place information is the activity of other vehicles, referred to as mirroring herein. FIG. 5 illustrates a process 500 describing mirroring techniques, 504, by determining environmental conditions, such as time of day, 506, and monitors vehicle actions in the place, 508. Evaluation of other vehicle actions and consideration of the environmental conditions 510 determine which actions the vehicle will apply, 512. In one situation, the vehicle will mirror one or more other vehicles, 514, and in another situation, the vehicle will reject the actions of other vehicles, 516. This monitoring, tracking and considering the actions of other vehicles provides additional guidance to the sensor fusion and driver of the vehicle. Mirroring is a good check on perceptions of a perception engine, verifying, rejecting or adjusting the results of the perception engine. Mirroring may be an optional process added to a sensor system.

Figure 6:
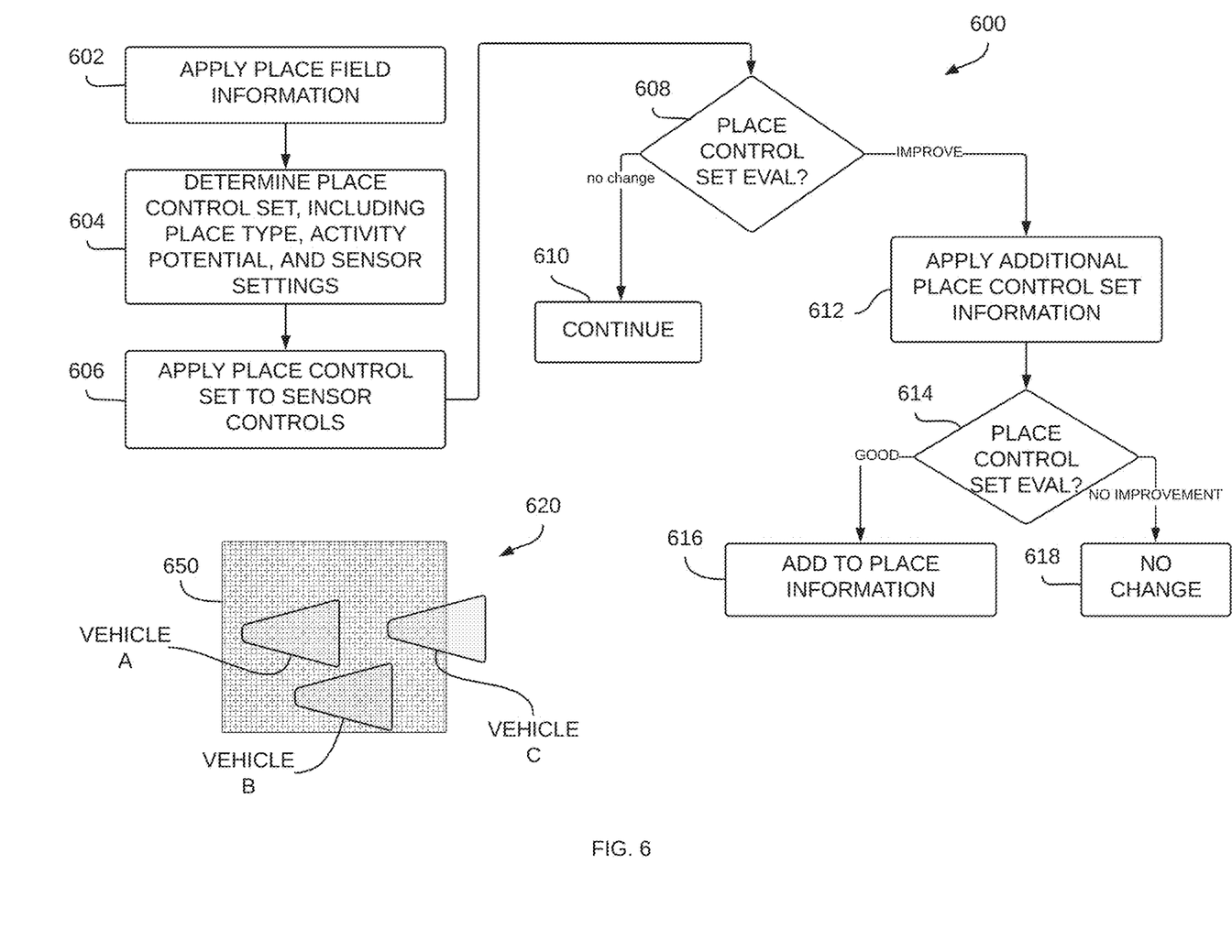
FIG. 6 illustrates example process flows for a perception engine and sensor control.

FIG. 6 illustrates a portion of processing to apply place information, 602, determine place control set, including place type, activity potential and sensor settings, 604, and apply the place control set to sensor controls, 606. Evaluation of the control set, 608, determines if the place information does not significantly improve performance of a perception engine, 610, or if additional improvements are possible, 612. By application of the place control set information, 612, the processing may improve. The new results are evaluated, 614, and the information is added to place information 616 or no change is made, 618. As illustrated in the place field 620, a vehicle A may mirror the behavior of vehicle B and/or vehicle C as they move through the environment. Processing may involve comparing activity of the vehicles B, C and if they are similar, vehicle A will mirror that activity. If the activity of vehicles B, C are dissimilar, vehicle A will reject their actions and continue without mirroring.

Figure 7:
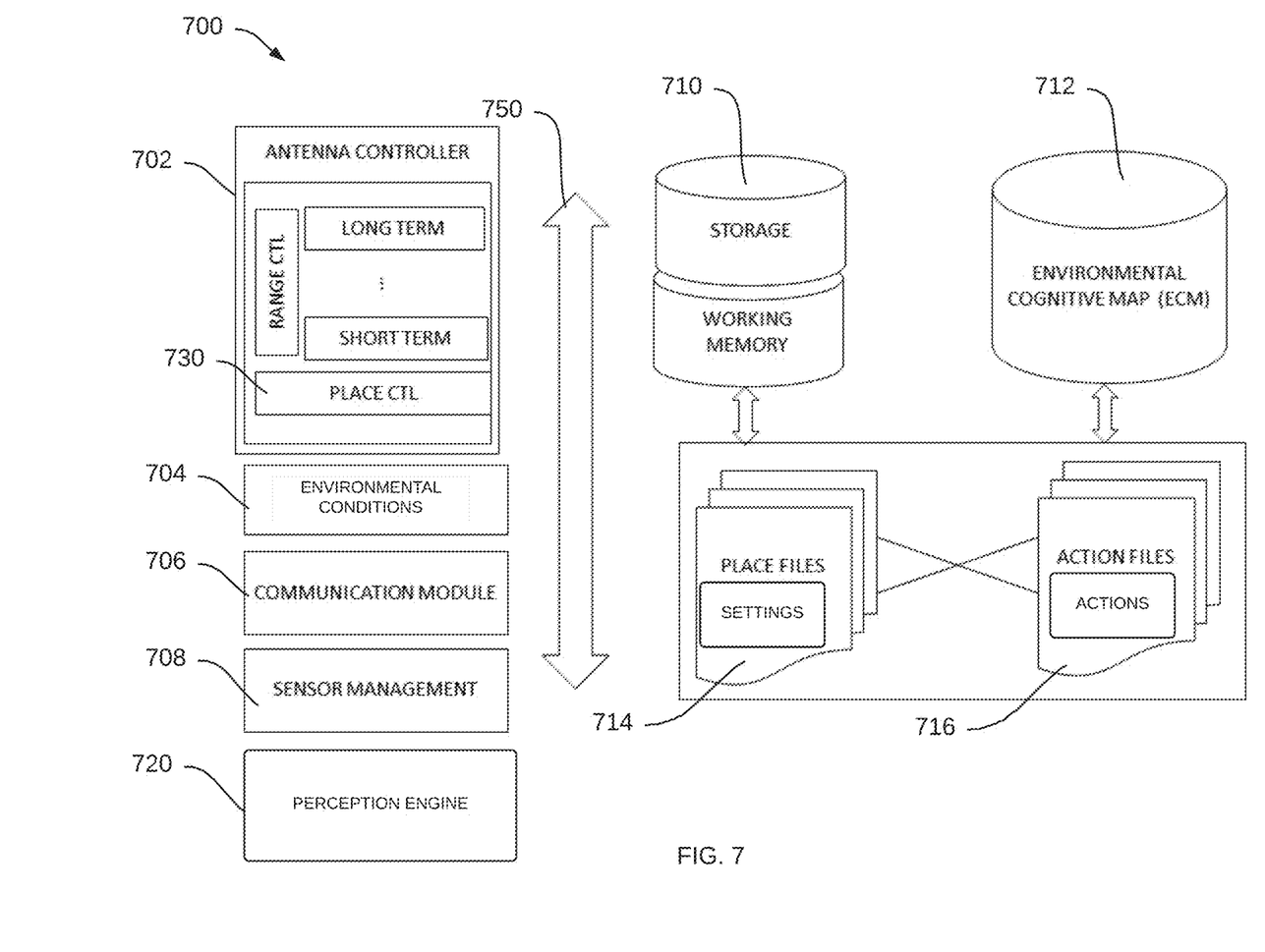
FIG. 7 illustrates an example organization of a perception engine incorporating place information.

FIG. 7 illustrates a sensor system 700 having a perception engine 750 incorporating place information. The place information is stored in place files having settings, 714, and corresponding action files, 716. The place files may include a variety of information based on sensor mapping to place and situation. The combination of place files 714 and action files 716 is coordinated into an environmental cognitive map (ECM) 712 that defines not only the adjustments to a perception engine but also identifies actions that may be taken in these type places. The antenna controller 702 includes a range control unit to identify the target range of the sensor, from a long term to a short term. Place control module 730 is also provided to identify a current place and incorporate this place info into the perception process. The perception engine 720 uses the sensor inputs, the place information and the environmental conditions to detect and identify objects and conditions in the environment. The result of the perception engine 720 is mapped as the ECM 712. The ECM information may be used in other situations with similar place situations.

The system 700 includes an environmental conditions module 704 to direct the sensor(s) to collect specific information, receive sensor information, extract environmental conditions and information. This information assists in control and operation of the perception engine 720. Additionally, the system 700 includes a communication module 706 adapted for communication with a system, other machines and so forth, and sensor management unit 708. The sensor management unit 708 acts to control operation of sensors, coordination of sensors, and providing information to other modules in the system 700. Information flows in system 700 through direct connections and a communication bus 750. The system includes memory storage 710, including working memory, that operates to maintain information that is pulled as needed. The memory 710 and ECM 712 communicate with the place files 714 and action files 716.

Figure 8:
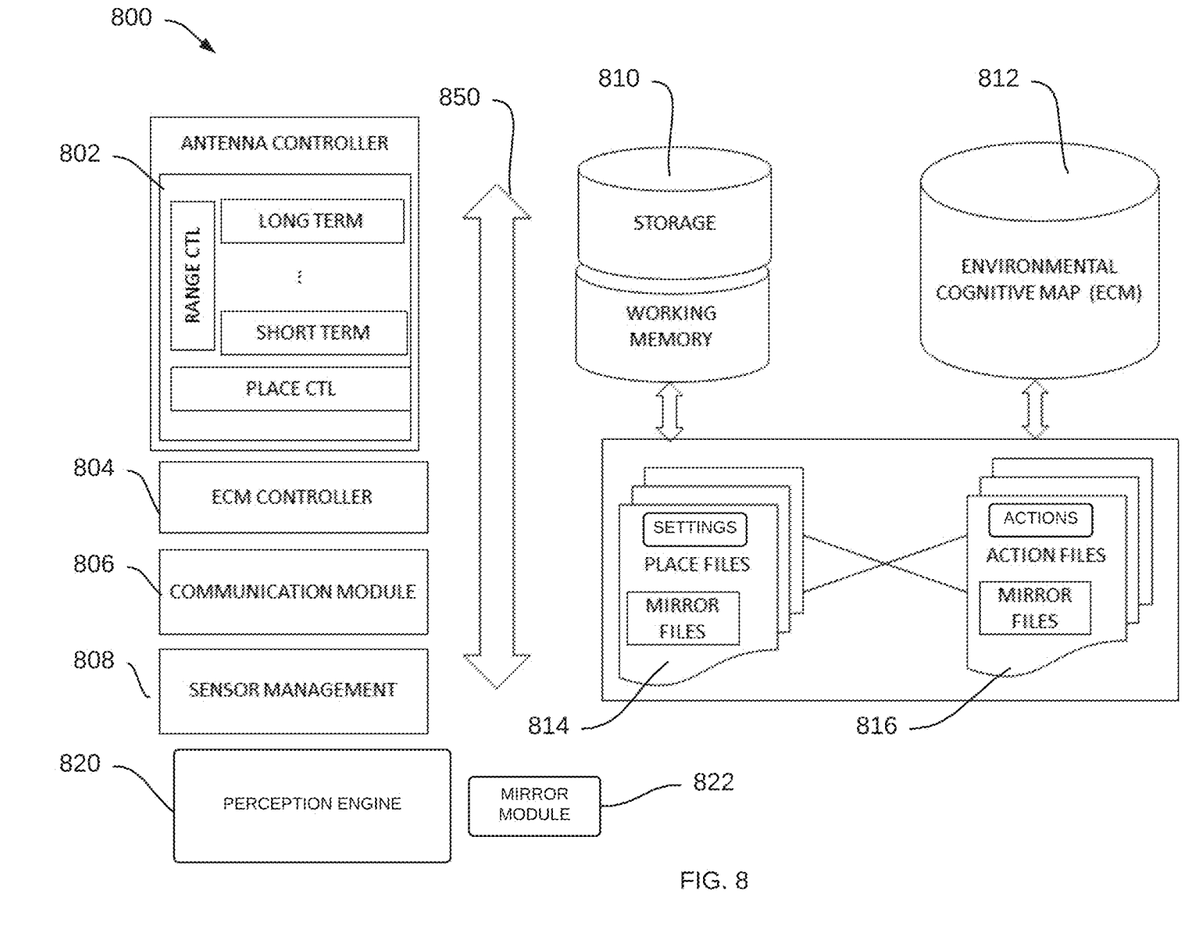
FIG. 8 illustrates an example organization of a perception engine incorporating mirror actions.

FIG. 8 is a system 800 similar to system 700 incorporating mirror processing. In this example a mirror module implements mirroring functions to compare the perceptions, behaviors, controls and actions of the current system 800 to another vehicle or machine. In this way, the mirror module 822 may identify a way to respond to a common situation or may be forewarned of an issue. Within a networked scenario, a central controller may receive information from a variety of vehicle going through a winding road. One or more vehicles may take actions that reduce the risk of error or accident; these actions are then built into a central system that may broadcast or send this information to another vehicle. The mirror information is stored in mirror files within the place files 814 and action files 816. Other modules are similar to those of FIG. 7.

Figure 9:
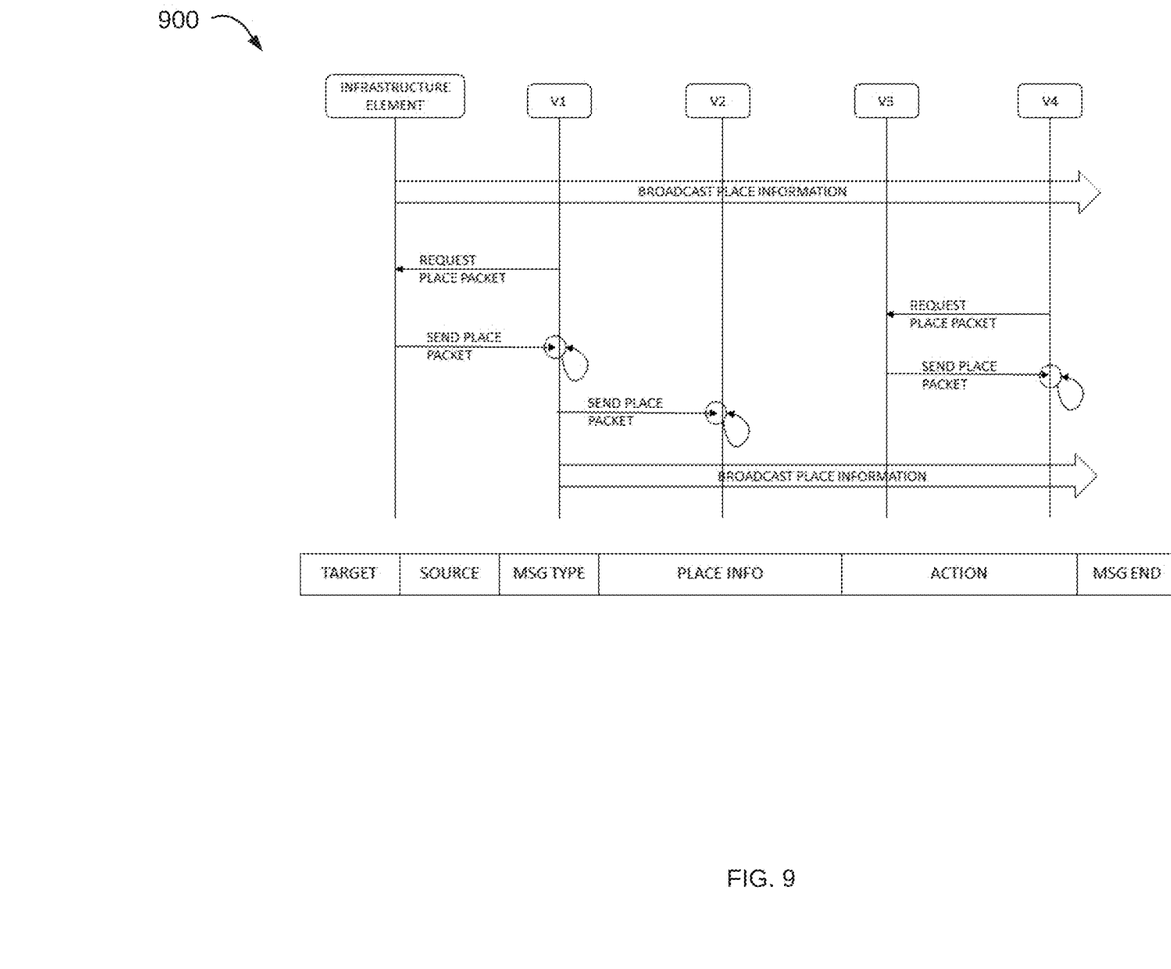
FIG. 9 illustrates an example signal timing diagram of a perception engine incorporating place information.

FIG. 9 illustrates a timing diagram 900 for operation of a perception engine within an environment having capability to provide place information. This may be a smart city using information and communication to increase information throughout the environment. In such a city, information may be provided by infrastructure, such as to broadcast traffic information from a traffic signal or road sign or may be provided by broadcast or communication modules positioned throughout the city. The communication modules receive requests for information and respond accordingly. In some examples, the road may have technology that sends information to vehicles as to the condition of the road. In FIG. 9, vehicles receive broadcast information from an infrastructure element. The vehicles may also request packets of information that may be used to identify the type of place and/or specifics of the place. This gives the vehicle a vehicular sense of place. The messaging between the infrastructure element and the vehicles may take a variety of forms. An example message format is illustrated with addressing information (target and source), message type indicator, the place and action information, which is the payload, and a message end indicator.

Figure 10:
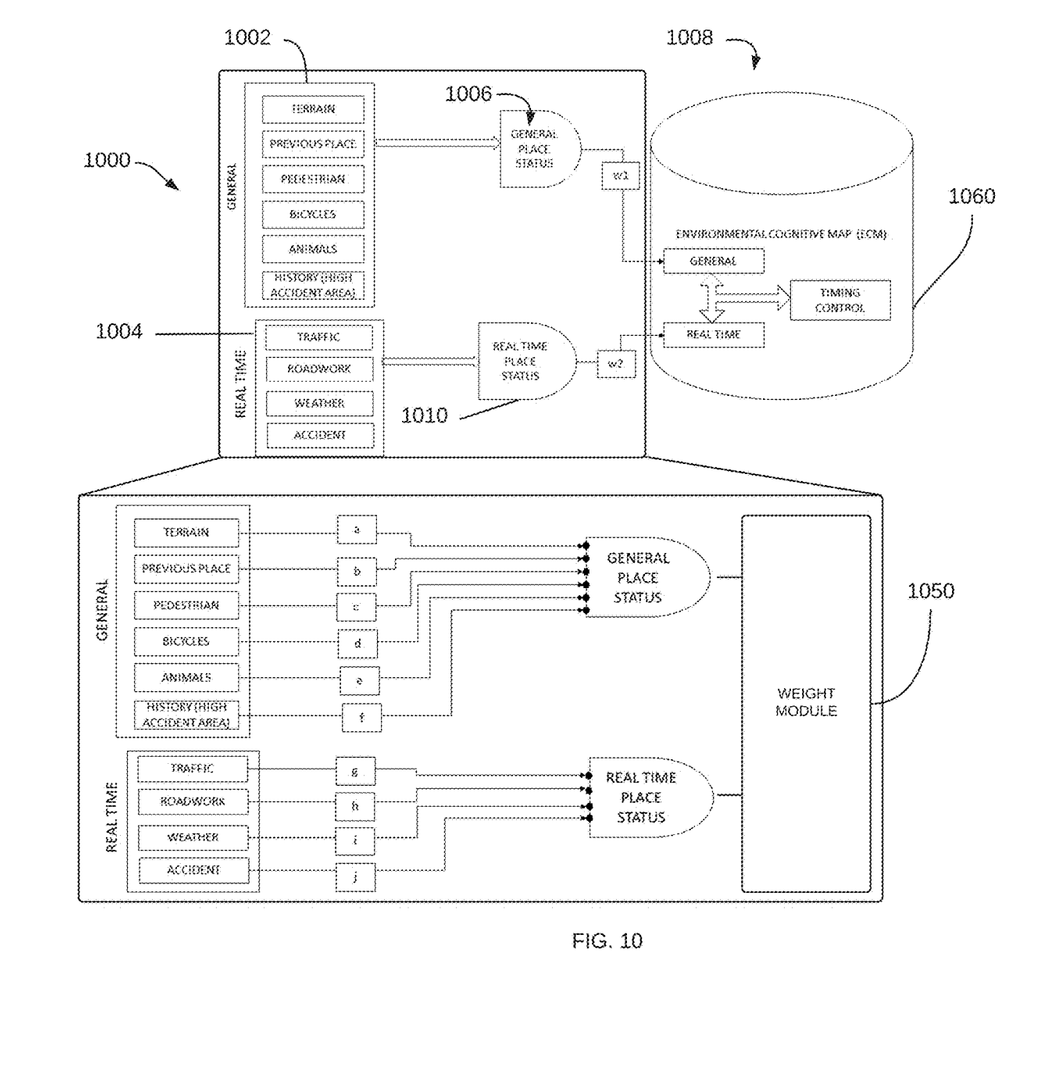
FIG. 10 illustrates an example perception engine incorporating weighted place information.

As discussed hereinabove, there are a variety of sources for information to provide a sense of place to a perception engine. Some of these are illustrated in the system 1000 of FIG. 10. The individual information elements are considered as general conditions 1002, including information regarding terrain, previous place of travel, pedestrian activity, bicycle activity, animal presence, accident history, action potential and so forth. Additionally, the system 1000 incorporates real time information 1004, including current traffic conditions, roadwork underway, weather conditions, accident status, and so forth. These may then be considered individually or in combination, such as at real time place status gate 1010 and general place status gate 1006, which may then be weighted by weight module 1050. The information is incorporated into the ECM 1060, where the ECM 1060 assists a sensor and perception system to respond to information and map these to actions. There may be any number of methods to weight the various inputs. Some input weights may be related to or a function of other weights.

Figure 11:
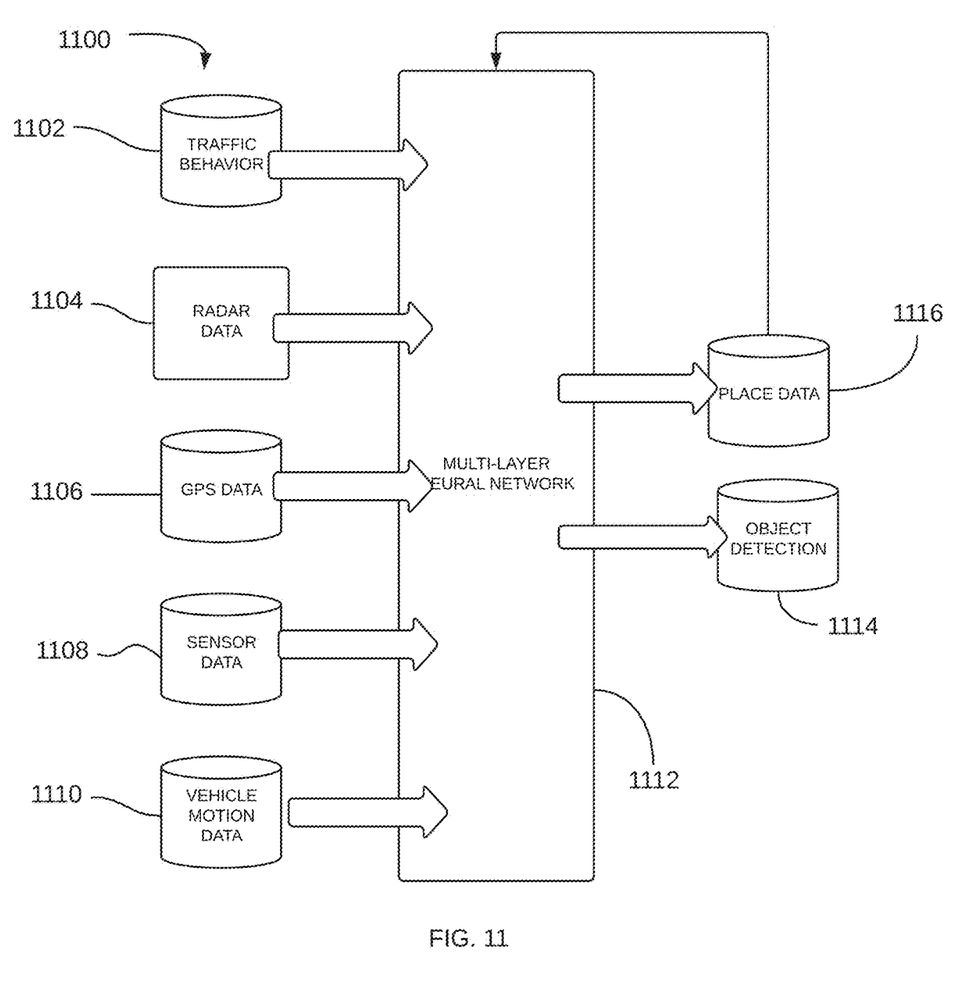
FIG. 11 illustrates an example perception engine system incorporating place and environmental information.

FIG. 11 illustrates a system 1100 having a multi-layer neural network 1112 receiving a variety of inputs for processing and perception. The inputs include traffic behavior information 1102, radar data 1104, GPS data 1106, sensor data 1108, vehicle motion data 1110 and so forth. Place data 1116 is also input and it determines control of the other inputs, such as to adjust weights, thresholds and other parameters of the multi-layer neural network 1112. The outputs provide object detection and identification 1114 and also provide updates to place data 1116.

In these various embodiments and examples, place information assists and supplements information from sensors by providing a vehicular sense of place that gives context to the individual signals received from sensors, such as from radar, laser, camera and so forth. The place information may be received from infrastructure in the environment. In some embodiments, the perception engine considers each place field into which a vehicle enters as a grid, where the grid portions may be described by various conditions. These conditions may include the curvature of the road, the behavior of the vehicle, the weather and so forth. These are then compiled into a place database of information and may be classified into place types, such as city block, country road, and so forth. This information improves the capabilities and performance of a perception engine.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. An object identification module for a vehicle in an environment, comprising:
   a perception engine network configured to receive and process sensor data from one or more sensors of the vehicle in the environment,
      wherein the perception engine network includes a plurality of perception engines of a first type with each perception engine of the first type being associated with a specific location or a specific type of location and trained on the specific location,
      wherein a first perception engine of the plurality of perception engines is associated with a first location or a first type of location and trained on the first location, and
      wherein a second perception engine of the plurality of perception engines is associated with a second location or a second type of location and trained on the second location, the second location being different from the first location and the second type of location being different from the first type of location;
   a perception engine of a second type configured to identify a location or a type of location of the vehicle and to identify a second vehicle within the environment; and
   an engine controller coupled to the perception engine of the second type and the perception engine network, the engine controller configured to receive information related to the location or the type of location of the vehicle from the perception engine of the second type, and in response to receiving the information related to the location or the type of location of the vehicle, the engine controller identifies the location or the type of location of the vehicle as the first location or the first type of location and selects the first perception engine of the plurality of perception engines of the first type to process the sensor data.

2. The object identification module as in claim 1, wherein the plurality of perception engines of the first type are neural network modules.

3. The object identification module as in claim 1, wherein the engine controller is further configured to adjust an operation of the perception engine network by changing parameters of the perception engine network.

4. The object identification module as in claim 3, wherein the parameters include weights for connections within the perception engine network.

5. The object identification module as in claim 3, wherein the parameters include thresholds for decisions within the perception engine network.

6. The module as in claim 1, wherein the perception engine of the second type is further configured to classify the identified location or type of location as new if the identified location or type of location is encountered less than a threshold number of times.

7. The module as in claim 1, wherein the activities of other vehicles are broadcasted by a central system that collects the activities of other vehicles.

8. A method for automated environmental perception, the method comprising:

receiving location information about a location of a vehicle in an area;

providing the location information to an environmental cognitive map (ECM) configured to identify actions based on the received location information;

identifying, via the ECM, a perception engine for use with the location information, wherein the location information comprises a first location or a first type of location, and wherein the perception engine is trained on the first location or the first type of location, wherein the perception engine is one of a plurality of perception engines with each perception engine being associated with a specific location or a specific type of location, and trained on the specific location or the specific type of location, and wherein the plurality of perception engines further includes a second perception engine associated with a second location or a second type of location, and trained on the second location or the second type of location;

receiving sensor information, the sensor information including an activity of at least one other vehicle within the area;

operating the perception engine using the sensor information; and adjusting the operating of the perception engine based on the use of the identified perception engine with the location information.

9. The method as in claim 8, further comprising:
controlling the vehicle based on the use of the identified perception engine.

10. The method as in claim 9, further comprising:
initiating a mirror processing;
determining environmental conditions;
identifying a second vehicle in the area;
monitoring second vehicle actions of the second vehicle;
evaluating the second vehicle actions in the environmental conditions; and
mirroring the second vehicle actions.

11. The method as in claim 10, where the monitoring the second vehicle actions comprises monitoring multiple actions of multiple vehicles.

12. The method as in claim 10, wherein the second vehicle actions are stored in a location file.

* * * * *